United States Patent
Grunnet et al.

(10) Patent No.: US 11,542,921 B2
(45) Date of Patent: Jan. 3, 2023

(54) APPARATUS AND METHODS FOR MONITORING THE AMBIENT ENVIRONMENT OF WIND TURBINES

(71) Applicant: VESTAS WIND SYSTEMS A/S, Aarhus N (DK)

(72) Inventors: Jacob Deleuran Grunnet, Tranbjerg J (DK); Claus Thybo, Åbyhøj (DK); Johnny Nielsen, Svenstrup J (DK)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 236 days.

(21) Appl. No.: 16/623,159

(22) PCT Filed: Jun. 14, 2018

(86) PCT No.: PCT/DK2018/050140
§ 371 (c)(1),
(2) Date: Dec. 16, 2019

(87) PCT Pub. No.: WO2018/228651
PCT Pub. Date: Dec. 20, 2018

(65) Prior Publication Data
US 2021/0140410 A1    May 13, 2021

(51) Int. Cl.
*F03D 80/40*    (2016.01)
*F03D 17/00*    (2016.01)
(Continued)

(52) U.S. Cl.
CPC ............. *F03D 80/40* (2016.05); *F03D 17/00* (2016.05); *F03D 1/0675* (2013.01); *F03D 80/60* (2016.05);
(Continued)

(58) Field of Classification Search
CPC .......... F03D 17/00; F03D 80/40; F03D 80/60; F05B 2260/20; F05B 2270/323
See application file for complete search history.

(56) References Cited

U.S. PATENT DOCUMENTS 7,677,075 B2 * 3/2010 Nies ........................ G01K 15/00
73/1.01
8,200,451 B2 * 6/2012 Battisti ................... F03D 80/40
702/136
(Continued)

FOREIGN PATENT DOCUMENTS

CN    103195663 A    7/2013
CN    105464912 A    4/2016
(Continued)

OTHER PUBLICATIONS

Chinese Office Action for Application No. 201880038625.3 dated Sep. 4, 2020.
(Continued)

*Primary Examiner* — Christopher R Legendre
(74) *Attorney, Agent, or Firm* — Patterson + Sherdan, LLP

(57) ABSTRACT

An apparatus for monitoring an ambient environment of a wind turbine is described. The apparatus comprises a cooling system comprising first and second heat exchangers, and a fluid circuit arranged to enable coolant to flow between the first and second heat exchangers. The apparatus further comprises a processor configured to: monitor one or more operational parameters of the cooling system; determine an efficiency of the cooling system based on the monitored one or more operational parameters; and calculate a liquid water content of the ambient environment based on the measured efficiency of the cooling system.

18 Claims, 5 Drawing Sheets

(51) Int. Cl.
*F03D 80/60* (2016.01)
*F03D 1/06* (2006.01)

(52) U.S. Cl.
CPC ....... *F05B 2260/20* (2013.01); *F05B 2270/32* (2013.01); *F05B 2270/323* (2013.01); *F05B 2270/325* (2013.01)

(56) References Cited

U.S. PATENT DOCUMENTS

| | | | | |
|---|---|---|---|---|
| 8,738,192 | B2* | 5/2014 | Uphues | F03D 7/0272 |
| | | | | 700/287 |
| 9,004,046 | B2* | 4/2015 | Glugla | F02M 25/0227 |
| | | | | 123/542 |
| 10,712,301 | B2* | 7/2020 | Begin-Drolet | B64D 15/20 |
| 11,111,905 | B2* | 9/2021 | Airoldi | F03D 80/80 |
| 11,365,723 | B2* | 6/2022 | Grunnet | F03D 80/60 |
| 2005/0276696 | A1 | 12/2005 | LeMieux | |
| 2009/0306928 | A1 | 12/2009 | Battisti | |
| 2012/0133152 | A1* | 5/2012 | Wagoner | F03D 80/60 |
| | | | | 290/1 B |
| 2013/0031966 | A1 | 2/2013 | Egedal et al. | |
| 2013/0177416 | A1* | 7/2013 | Renschler | F03D 80/40 |
| | | | | 416/1 |
| 2020/0116132 | A1* | 4/2020 | Grunnet | F03D 80/40 |
| 2021/0140410 | A1* | 5/2021 | Grunnet | F03D 80/40 |

FOREIGN PATENT DOCUMENTS

| | | |
|---|---|---|
| EP | 1906192 A2 | 4/2008 |
| EP | 1918581 A2 | 5/2008 |
| EP | 2029428 A1 | 3/2009 |
| EP | 2615301 A1 | 7/2013 |
| WO | 2013004893 A1 | 1/2013 |
| WO | 2016141477 A1 | 9/2016 |
| WO | 2018228651 A1 | 12/2018 |

OTHER PUBLICATIONS

PCT Written Opinion of the International Seaching Authority for Application No. PCT/DK2018/050140.
PCT International Search Report for Application No. PCT/DK2018/050140 dated Aug. 20, 2018.
Danish Patent and Trademark Office, 1st Technical Examination including The Search Report for Application PA 2017 70467 dated Dec. 12, 2017.

* cited by examiner

APPARATUS AND METHODS FOR MONITORING THE AMBIENT ENVIRONMENT OF WIND TURBINES

TECHNICAL FIELD

Aspects of the present invention relate to an apparatus and method for monitoring the ambient environment of wind turbines, and more particularly to systems and methods for estimating the liquid water content of the ambient environment, and for controlling or decisioning actions taken in wind turbine systems in dependence on the estimated liquid water content.

BACKGROUND

Wind turbines that are to be installed in cold climates make up a large proportion of the global wind turbine market, as such climates tend to have high wind resources, particularly during the winter. However, due to the low temperatures experienced in these locations during the winter, the likelihood of ice build-up on the wind turbine blades is high. The build-up of ice on the turbine blades adversely affects the power production efficiency and forces on the rotor.

Various types of de-icing (and anti-icing) systems and methods have already been implemented in cold climate wind turbines. For example, a controlled blade acceleration/deceleration to shake off the ice is sometimes utilised. De-icing systems may additionally or alternatively involve the incorporation of built-in electric heating elements within the blades, or the provision of a heating unit in the hub which distributes hot air throughout the generally hollow blade interiors.

In such active solutions, it is important to ensure that the de-icing systems are triggered at an appropriate point in time, in order to make the most efficient use of them. Many of the currently-implemented de-icing systems comprise trigger mechanisms that are activated based on the degradation of the power curve, and specifically the de-icing system is triggered or activated when the measured output power reaches a particular threshold value.

These triggering or activation mechanisms typically require a substantial build-up of ice before the decrease in output power of the wind turbine is sufficient to satisfy the necessary threshold conditions, since a large amount of ice is required to have formed in order to cause the necessary drop in output power. However, in particularly cold conditions, even after the de-icing system is activated, the subsequent removal of ice may not occur at a sufficiently fast rate to counter the re-formation of the ice on the blades.

It is against this background that the embodiments of the invention have been devised.

SUMMARY OF THE INVENTION

According to an embodiment of the present invention there is provided an apparatus for monitoring an ambient environment of a wind turbine. The apparatus comprises a cooling system comprising first and second heat exchangers, and a fluid circuit arranged to enable coolant to flow between the first and second heat exchangers. The apparatus further comprises a processor configured to: monitor one or more operational parameters of the cooling system; measure an efficiency of the cooling system based on the monitored one or more operational parameters; and calculate a liquid water content of the ambient environment based on the measured efficiency of the cooling system.

The cooling system efficiency has a quantifiable relationship or correlation with the liquid water content of the air, and the above configuration utilises this correlation to enable the estimation of the liquid water content in the ambient environment of a wind turbine using existing equipment that has already been installed on the wind turbines. Advantageously, this allows the associated method to be applied to all existing wind turbines without the need to retrofit any additional sensors. This therefore makes such methods easier and cheaper to implement on a large scale.

In some cases, the processor may be further configured to determine an expected efficiency of the cooling system; and to calculate the liquid water content of the ambient environment based on a difference between the expected and measured efficiencies of the cooling system.

Optionally, the processor may be further configured to generate a control signal for output to a wind turbine sub-system in dependence on the calculated liquid water content. Additionally or alternatively, the processor may be configured to transmit the calculated liquid water content to a further sub-system of the wind turbine.

The expected efficiency of the liquid cooling system is simple to compute based on engineering models used to scale the cooling system, and the actual efficiency of the cooling system is simple to calculate based on the difference in inlet and outlet temperature of the heat exchanger. Advantageously, the above configuration provides a simple and straightforward method for estimating the liquid water content of the air, which may subsequently be used to control or drive decisioning that governs the actions of various wind turbine sub-systems. One example is the wind turbine de-icing system, but other wind turbine sub-systems may also be controlled using this information.

Optionally, the first heat exchanger is arranged to absorb thermal energy from an internal environment of the wind turbine. Preferably, the internal environment of the wind turbine corresponds to the internal environment of the wind turbine nacelle. Making use of the existing cooling system that has been installed in the wind turbine advantageously simplifies the implementation of the apparatus and associated method in existing wind turbines.

The second heat exchanger may be arranged to transfer thermal energy to an ambient environment external to the wind turbine. Optionally, at least a portion of the second heat exchanger may be located on the nacelle of the wind turbine. An advantage of monitoring parameters of the portion of the heat exchanger located external to the wind turbine (e.g. on top of the nacelle) is that these parameters will accurately reflect the current conditions of the ambient environment around the wind turbine, without requiring any additional sensors to be retrofit.

In some instances, the operational parameters to be monitored correspond to at least one of the following: an outlet temperature of the second heat exchanger, an inlet temperature of the second heat exchanger, and a volume of coolant flow through the second heat exchanger. These values are used in the computation of the cooling efficiency of the cooling system. In particular, monitoring either the outlet temperature of the cooling system heat exchanger or the difference between the inlet and outlet temperatures of the heat exchanger, allows easy inference of the liquid water content of the surrounding air, as such values are easily measured using existing sensors.

The processor may be further configured to calculate the liquid water content of the ambient environment based on a calculation of the rate of evaporation of liquid water from an exposed surface of the heat exchanger. Based on the dimensions and design of the heat exchanger, it is possible to relate the rate and amount of water being evaporated from the surface of the heat exchanger with the liquid water content in the air.

Optionally, the processor may be further configured to generate a control signal for output to a wind turbine sub-system if the calculated liquid water content of the ambient environment exceeds a pre-defined threshold value. Advantageously, this allows the control of various wind turbine sub-systems to be carried out in an automated manner, based on a threshold value that has been defined based on prior knowledge and analysis. This simplifies the operation of the wind turbine sub-systems and allows control of these systems to be carried out in dependence of pertinent environmental conditions.

According to another embodiment of the present invention there is provided a wind turbine comprising the apparatus as described above for monitoring the ambient environment.

According to another embodiment of the present invention there is provided a method for monitoring an ambient environment of a wind turbine. The method comprises: monitoring one or more operational parameters of a cooling system of the wind turbine; measuring an efficiency of the cooling system based on the monitored one or more operational parameters; and calculating a liquid water content of the ambient environment based on the measured efficiency of the cooling system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A specific embodiment of the invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily. In particular, it will be understood that whilst the following description mainly focuses on a specific case of icing risk detection based on the estimated liquid water content, the general concept of monitoring a wind turbine's ambient environment, and estimating the liquid water content on the basis of the wind turbine cooling system efficiency, may be subsequently utilised to drive further control or decision actions for other sub-systems or components within the overall wind turbine system.

Figure 1:
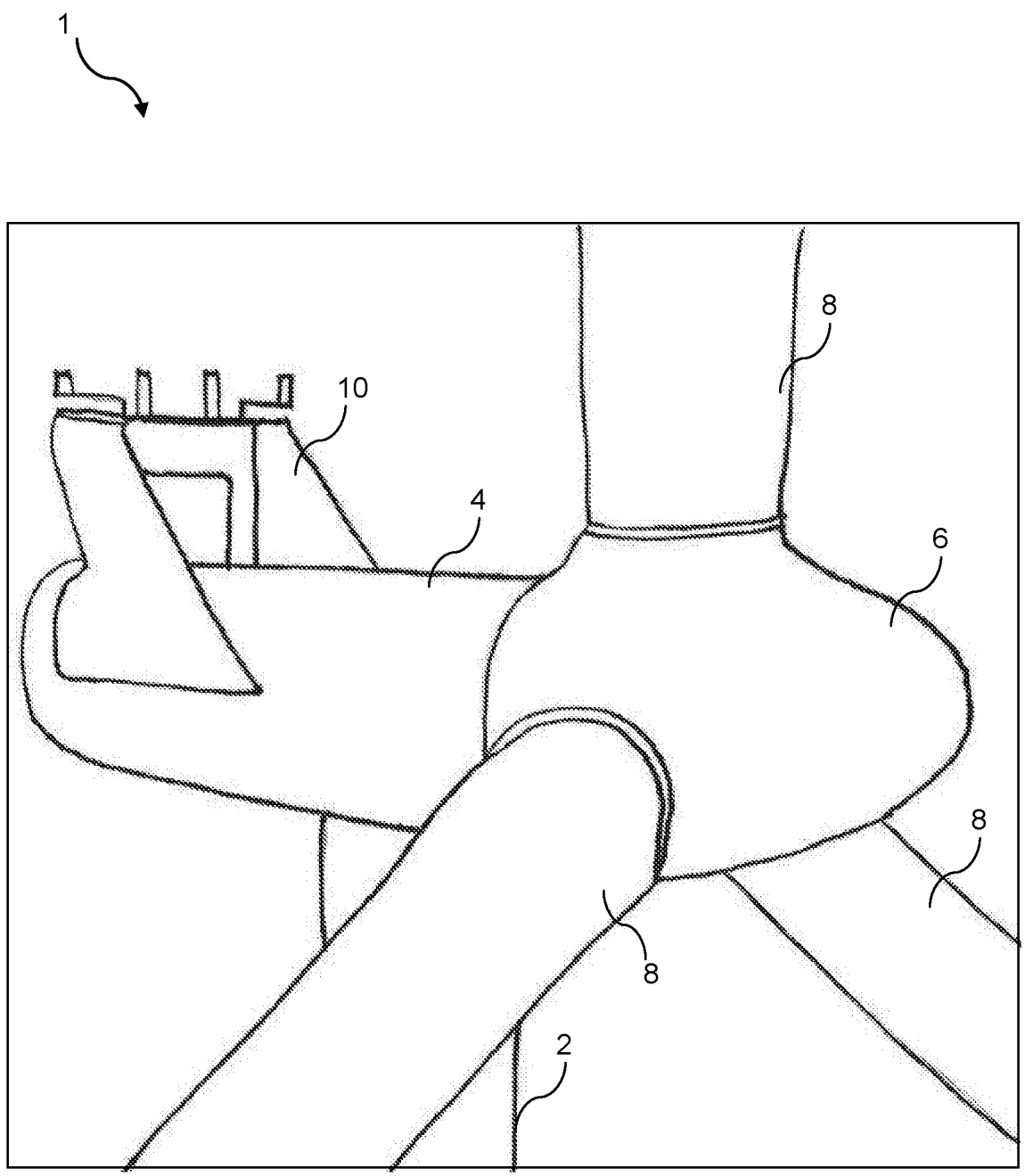
FIG. 1 shows a simplified diagram of a wind turbine in which embodiments of the present invention may be implemented.

In order to place the embodiments of the invention in a suitable context, reference will firstly be made to FIG. 1, which illustrates schematically a portion of a typical wind turbine in which an apparatus for monitoring an ambient environment of the wind turbine, and in particular for estimating liquid water content in the ambient environment and for controlling a sub-system of the wind turbine according to an embodiment of the present invention may be implemented.

The wind turbine 1 comprises a tower 2, a nacelle 4 rotatably coupled to the top of the tower 2, a rotating hub 6 mounted to the nacelle 4 and a plurality of wind turbine rotor blades 8 coupled to the hub 6. Although not shown in these figures, it will be understood that the wind turbine further comprises a de-icing system and/or an anti-icing system which is arranged to remove ice from the blades 8, and to prevent the substantial build-up of ice on the wind turbine blades. Although de-icing and anti-icing systems do differ in terms of their functionality and operational parameters, such systems will simply be collectively referred to throughout this specification as 'de-icing systems' for simplicity. An example of such de-icing systems may be found in WO 2013/107457 (to the present applicant) which circulates heated air around the interior of the blades 8 to remove ice that has formed on the blades.

The nacelle 4 houses all of the generating components of the wind turbine, including the generator, gearbox, drive train and brake assembly, as well as convertor equipment for converting the mechanical energy of the wind into electrical energy for provision to the grid. The nacelle 4 also necessarily contains a main shaft housing (not shown in FIG. 1), which houses a main rotor shaft that is connected at a forward end to the hub 8 and rotor blades 10, and at a rear end to the generating components.

The nacelle 4 also contains a cooling system 10, a portion of which is located on the top of the nacelle 4 and is visible in FIG. 1 which is arranged to cool the components housed within the nacelle 4, for example the generator, gearbox and other drive train components. Typically, the cooling systems utilised in wind turbine nacelles are liquid cooling systems, and therefore the subsequent methods focus on the features of such systems. However, it will be understood that alternative systems such as evaporative cooling systems may be implemented instead, and the methods described herein may equally be applied to such alternative cooling systems. The liquid cooling system that will be described hereafter is one in which the coolant remains a liquid throughout the system, and merely varies in temperature. However, it will be appreciated that other variants of liquid cooling system could also be suitable for use in a wind turbine—for example, a two-phase liquid cooling system in which the coolant transitions between the liquid and vapour phases.

Figure 2:
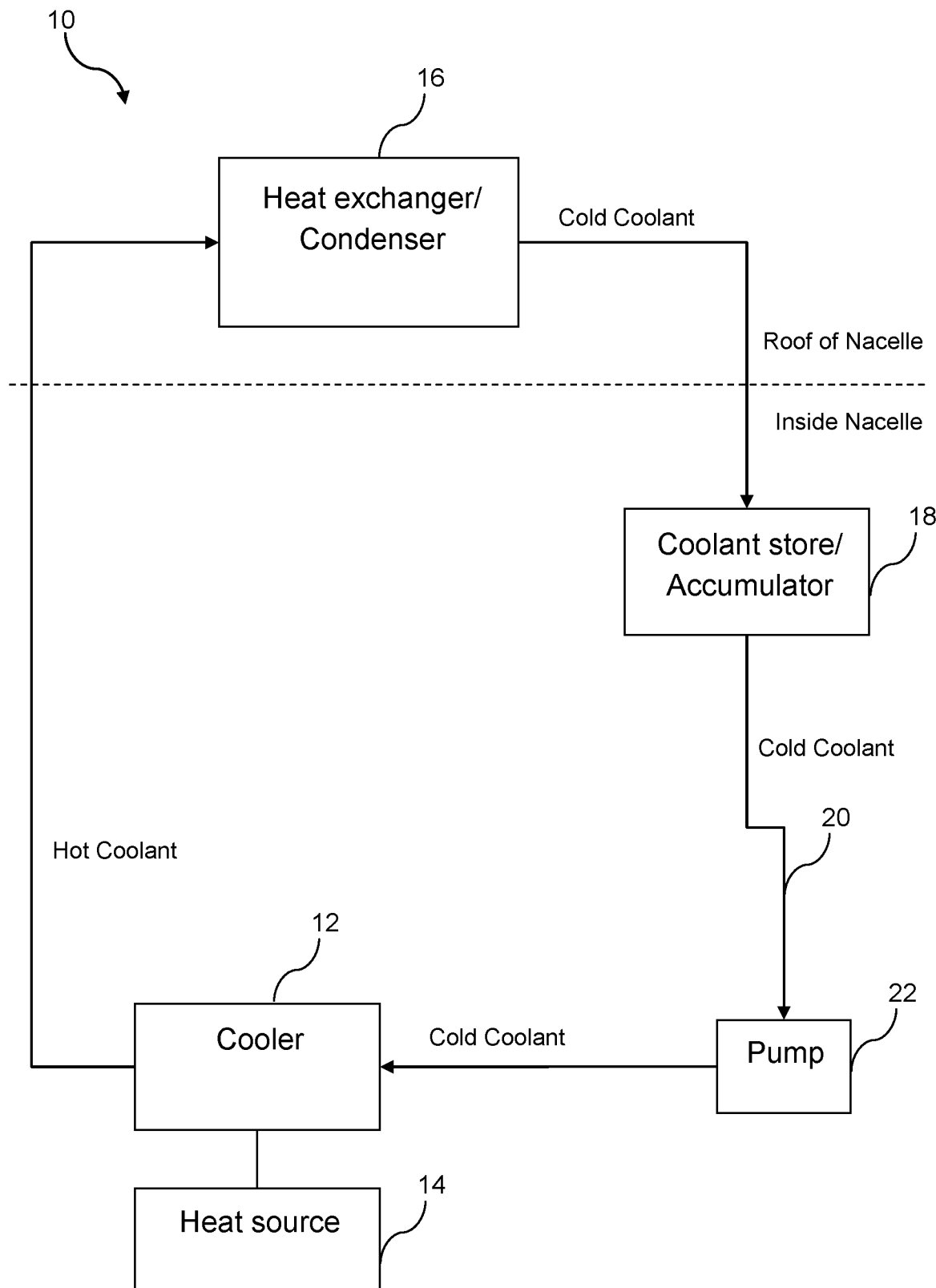
FIG. 2 shows a schematic diagram of a typical cooling system implemented in a nacelle of the wind turbine of FIG. 1.

FIG. 2 shows a typical liquid cooling system 10 that is utilised in wind turbines. As the operation of such liquid cooling systems is generally well known to the person skilled in the art, only a brief description of how such a system works will be provided here to place the embodiments of the invention in context.

In general, the purpose of the liquid cooling system is to transfer thermal energy from an internal environment of the wind turbine, out to the external environment of the wind turbine. The cooling system comprises first and second heat exchangers, connected by a fluid circuit such that coolant is able to flow between the two heat exchangers, The first heat exchanger is usually located within the wind turbine (for example, within the nacelle 4) and is arranged to absorb thermal energy from the internal environment of the wind turbine, and from specific heat-generating components within the nacelle. The second heat exchanger is usually located such that a portion of it is exposed to the external environment, so as to enable the transfer of thermal energy out to the external environment of the wind turbine. In some cases, the cooling system also comprises one or more monitoring components arranged to monitor the operational parameters of the cooling system, and thereby ensure that the cooling system is functioning as intended.

A specific example of a liquid cooling system implemented in a wind turbine will now be described in greater detail.

The liquid cooling system 10 comprises a cooler 12 (i.e. the first heat exchanger) in thermal contact with a heat source 14 that is to be cooled (for example, the generator or various other electronic components located within the nacelle). In some cases, the cooler 12 may take the form of a cold plate or cooling coils that are placed in direct or close proximity to the heat source 14, such that the coolant entering the cooler 12 absorbs thermal energy from the heat source 14. The liquid cooling system 10 also comprises a condenser 16 (i.e. the second heat exchanger) that receives heated coolant from the cooler 12 and enables the thermal energy from the coolant to be dissipated. The 'condenser' is generally referred to as such in those embodiments where the coolant is heated to a sufficient temperature to enable it to be vaporized, as the dissipation of thermal energy from the coolant by the condenser results in the re-condensation of the hot vaporized coolant into cooler liquid form. However, for simplicity and to avoid confusion between the two heat exchangers in the cooling system, the term 'condenser' will be used hereafter into refer generically to the second heat exchanger which is arranged to dissipate thermal energy to the external environment. The liquid cooling system 10 also comprises an accumulator 18 or coolant storage component arranged to receive and store cold liquid coolant from the heat exchanger. A pipe network 20 provides a fluid circuit and fluid connections between the various components, and a circulation pump 22 is also provided to drive circulation of coolant around the liquid cooling system 10 via the pipe network 20.

In use, as previously mentioned, the first heat exchanger—the cooler 12—is located within the nacelle 4 and in close proximity to the heat source 14 that is to be cooled. For example, as previously discussed, the cooler 12 may be placed directly under or next to the generator component. Alternatively, the cooler 12 may take the form of an air conditioning unit that blows cool air through the nacelle and across the hot components. The cooler 12 may also take the form of cooling fins projecting from various components to radiate thermal energy away from those components. In order to function efficiently, the second heat exchanger—the condenser 16—should be exposed to the outside air, and may be located on the roof of the nacelle 4 for example. Cold coolant is pumped from the accumulator 18 (where it is stored) to the cooler; the thermal energy from the heat source 14 is absorbed by the cold coolant which heats up. The hot coolant flows away from the cooler 12, carrying the thermal energy away, and enters the condenser 16 where the thermal energy is dissipated. The now cold coolant is then returned to the accumulator 18 to begin the cycle again.

Figure 3:
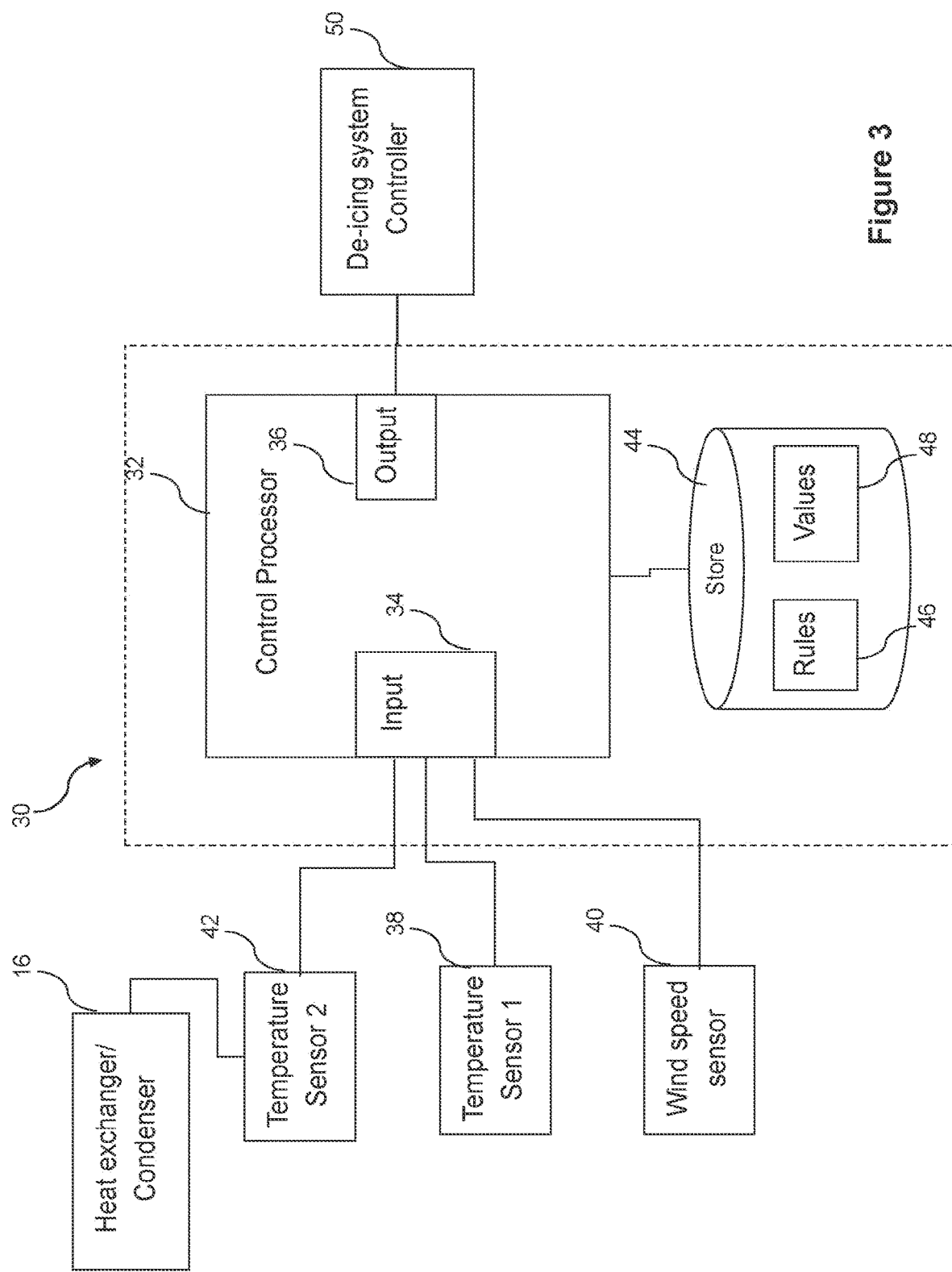
FIG. 3 shows a schematic block diagram of a control system, for monitoring an ambient environment of the wind turbine, and for estimating the liquid water content of the ambient environment and subsequently controlling a sub-system of a wind turbine, according to an embodiment of the present invention.

FIG. 3 shows an apparatus for determining an icing risk of a wind turbine, and also places the apparatus its intended context for controlling a sub-system (such as the de-icing system) of the wind turbine according to an embodiment of the present invention.

The apparatus 30 comprises a control processor 32 arranged and configured to carry out various comparison and analysis steps in order to determine an icing risk of the wind turbine, and to ascertain whether the de-icing system of the wind turbine should be activated. The control processor 32 comprises an input 34 arranged to receive information that will be used during the subsequent analyses, and an output 36 arranged to provide a control signal to the de-icing system in dependence on the results of the analyses. In the present embodiment, the control processor 32 is arranged to receive information directly relating to properties of the external environment around the wind turbine, and in particular measurements of the meteorological conditions, for example the ambient air temperature around the wind turbine (received for example from an external temperature sensor 38), as well as the wind speed (received for example from an external wind speed sensor 40 or anemometer).

In addition, the control processor 32 is also arranged to receive information relating to properties of certain internal systems within the wind turbine, which properties indirectly reflect certain external environmental conditions. In particular, the control processor 32 is arranged to receive information relating to the efficiency of the condenser 16 provided as part of the wind turbine liquid cooling system 10; specifically, the control processor 32 is arranged to receive measurements of an outlet temperature of the condenser 16, or the temperature difference across the condenser 16, from one or more temperature sensors 42 associated with the condenser 16.

The control apparatus 30 also comprises a data store 44, in operative communication with the control processor 32, which stores a plurality of rules 46 specifying relationships between the various pieces of received information, and specifically between the various measureable properties of the external and internal environments of the wind turbine. These rules 46 are referred to by the control processor 32 when carrying out the analyses to determine whether the de-icing system should be activated. The rules 46 may require the comparison of received or measured data with pre-determined values 48 which are also stored in the data store 44. The control processor 32 is arranged to carry out its analyses of the received data, based on the rules 46 and values 48 stored in the associated data store 44, to determine the icing risk of the wind turbine. If the icing risk (i.e. the risk of ice formation and build-up on the wind turbine blades 8) is significant, the control processor 32 is configured to output a control signal to activate the de-icing system (for example, via a de-icing system controller component 50).

It will be appreciated that whilst the above functionality has been described with respect to separate functional blocks, this is merely for clarity purposes and the functionality could instead be incorporated into the de-icing controller. Furthermore, it will also be noted that determining an icing risk and controlling the operation of the de-icing controller 50 is merely one specific implementation of the controlling apparatus 30, and alternative sub-systems could be operated and controlled in a similar manner. This would simply require the de-icing controller 50 to be replaced with an equivalent controller for the alternative sub-system, and to ensure that the necessary rules 46 and values 48 are maintained in the data store 44.

Figure 4:
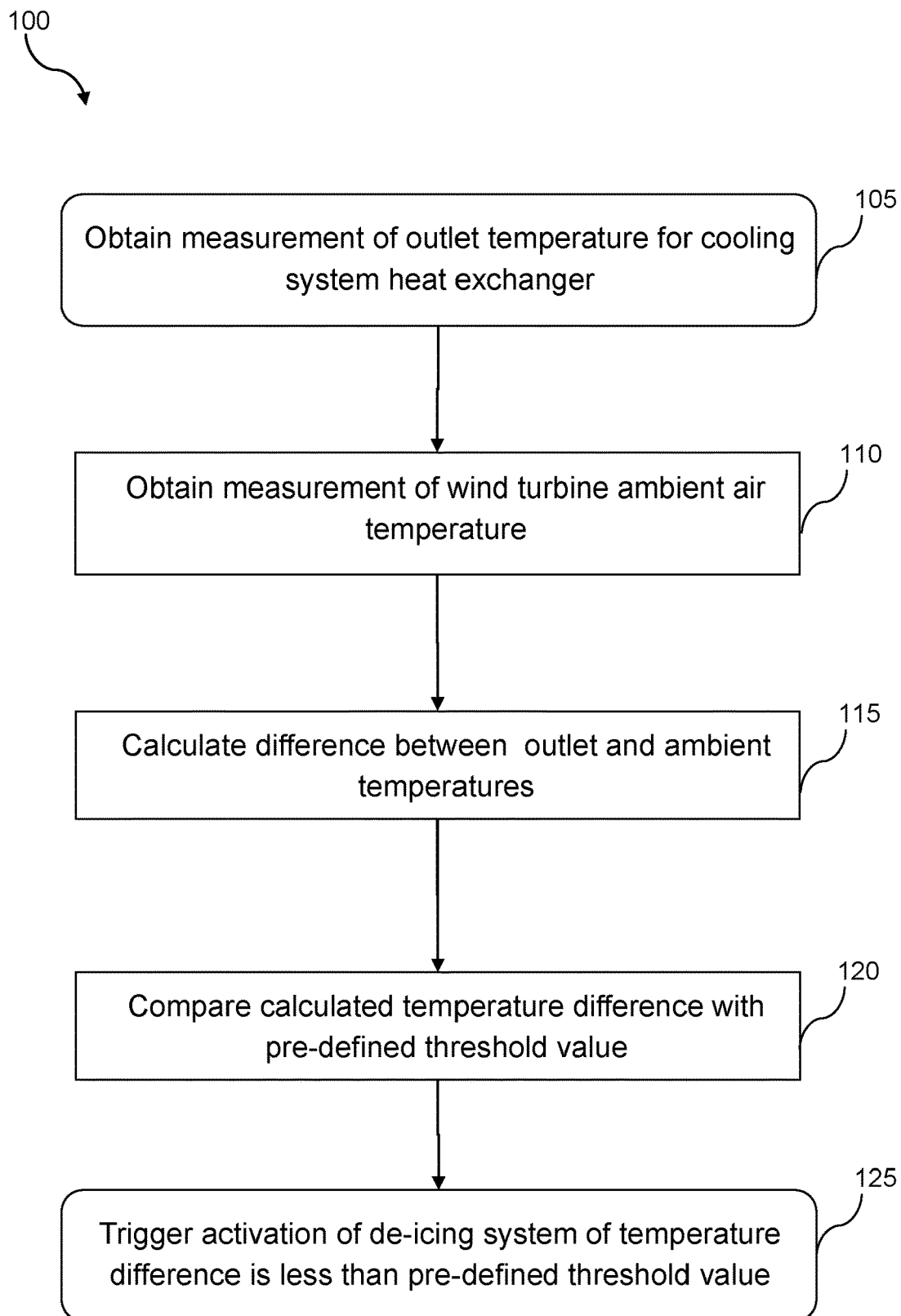
FIG. 4 is a flow chart showing an overview of a method for determining an icing risk and for controlling a sub-system of a wind turbine, according to an example implementation of the present invention.

FIG. 4 shows a flow chart illustrating a method for determining an icing risk of a wind turbine, and for subsequently controlling activation of the wind turbine de-icing system according to an embodiment of the present invention. In particular, the method involves an analysis of the meteorological conditions around the wind turbine in order to ascertain the risk of ice forming on the wind turbine blades 8—if it is deemed that there is a high risk of ice formation, the de-icing system will be activated.

In summary, the method involves the control processor 32 receiving measurements of operational parameters of the nacelle cooling system 10, determining an icing risk based on these received operational parameters, and subsequently generating a control signal for output to the de-icing system if the icing risk is determined to be sufficient to warrant activation of the de-icing system.

To begin with, the theory underpinning this method needs to be considered before the method itself is described in detail.

The meteorological conditions that give a good indication of the risk of ice formation are the ambient temperature and the liquid water content of the air—a combination of low ambient temperature and high liquid water content of the surrounding air will result in a high risk of ice formation. At present, many wind turbine designs already incorporate sensors that measure the ambient air temperature; however, the majority of wind turbines are not fitted with standard sensors (or even any sensors at all) for measuring the liquid water content of the surrounding air as there is little or no need for such measurements during the majority of normal operations. Therefore, for all existing cold climate wind turbines to be retrofitted with the same or standard sensors designed with the express purpose of measuring the liquid water content of the surrounding air would be extremely costly and difficult to achieve.

However, the present applicant has appreciated that rather than retrofitting dedicated liquid water content sensors to existing wind turbine designs, various properties of the nacelle cooling system may be utilised instead in order to estimate the liquid water content of the surrounding (outside) air. In this approach, no dedicated additional components would need to be utilised; instead, the provision of some simple updates to the processing systems and methods that are currently in place in wind turbines is all that would be required.

Specifically, the present applicant has appreciated that there is a correlation between the efficiency of the condenser 16 (i.e. the heat flow out of the condenser 16) in the nacelle cooling system, and the risk of ice formation on the wind turbine blades 8. In particular, the heat flow out of the condenser 16 is highly dependent on the same two main environmental factors as the risk of ice formation—namely the ambient temperature and the liquid water content of the surrounding air. Other factors, such as the humidity (otherwise known as the water vapour content) of the surrounding air, have less of an effect on the efficiency of the condenser 16, and can be largely ignored in the subsequent calculations.

When there is sufficient liquid water content in the surrounding air, this water may be deposited onto the condenser 16, and in particular, on those portions of the condenser 16 that are located on the nacelle roof and are therefore exposed to the surrounding environment. As the condenser 16 absorbs thermal energy from the coolant passing through it, and radiates this thermal energy to the surrounding environment, the liquid water that is deposited on the condenser 16 is able to absorb this thermal energy and evaporate back into the air. This causes evaporative cooling of the condenser 16, and increases the efficiency of the condenser 16.

As a result of this increased efficiency, the coolant passing through the condenser 16 is cooled to a greater degree and emerges from the condenser 16 at a much lower temperature than would normally be observed. The temperature at the outlet of the condenser 16 is therefore decreased when the liquid water content of the outside air is higher.

A normally efficient condenser 16 will typically have an outlet temperature that is up to a few degrees higher than the ambient temperature of the surrounding air. However, where there is an increase in the efficiency of the condenser 16, and hence a corresponding decrease in the outlet coolant temperature, the difference between the outlet temperature and the ambient air temperature decreases. In other words, the gap between the two temperatures decreases when there is an increase in the liquid water content in the surrounding air. In some cases, the evaporative cooling effect is even sufficient to cause the outlet temperature to drop below the ambient temperature. The detection of such changes using sensors that are already incorporated within the wind turbine design lies at the heart of the present invention.

Furthermore, it will be appreciated that the methods proposed herein may be utilised with many different types of cooling system, as long as it is possible to compute the efficiency of the cooling system and compare it to the expected efficiency of the cooling system, with and without liquid water content in the air.

Returning now to a description of FIG. 4, the method 100 of the present invention begins at Step 105 with the control apparatus 30 receiving measurements of the outlet temperature of the nacelle cooling system condenser 16, as well as receiving at Step 110 measurements of the ambient air temperature around the wind turbine. The control processor 32 is configured to calculate in Step 115 the difference between the two measured temperatures, and to subsequently compare in Step 120 this difference to a pre-defined threshold value. If the difference between the two temperatures is less than this pre-defined threshold value, then this is deemed to be an indication of sufficiently high liquid water content in the surrounding air to indicate a high ice-formation risk. In the event that such a risk is deemed to exist, the control processor 32 is subsequently configured to output at Step 125 a control signal to the controller 50 of the de-icing system in order to trigger or activate the de-icing system.

Various other criteria may be used in combination with, or instead of, these threshold values to trigger the activation of the de-icing system. For example, if the absolute ambient temperature is also determined to be lower than a particular pre-defined threshold value, the combination of these two criteria being fulfilled may also be used to trigger activation of the de-icing system. Furthermore, it will also be appreciated that it is not strictly necessary for the pre-defined threshold value to correspond to a threshold temperature difference. Instead, the threshold value could simply correspond to a pre-defined minimum outlet temperature, below which it is determined that there is a significant risk of ice formation. It will be appreciated that the exact values, and the specific criteria (or combination of criteria) used to assess the risk of ice formation may be tailored to suit the meteorological conditions and wind turbine requirements in specific geographical locations.

Figure 5:
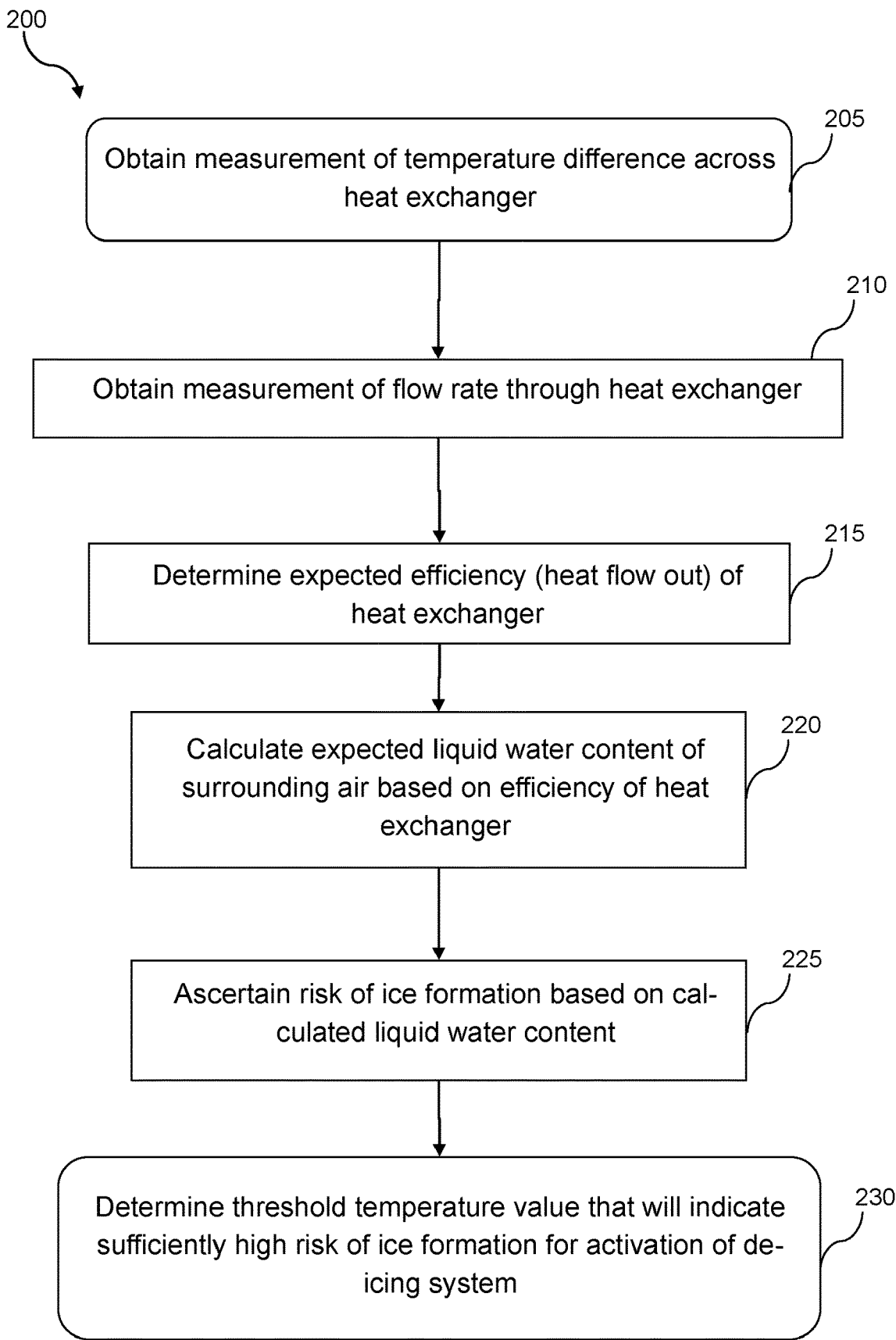
FIG. 5 is a flow chart showing an overview of a method utilised to determine reference values for use in monitoring an ambient environment of the wind turbine, according to an embodiment of the present invention.

A description of how the pre-defined threshold value used to trigger activation of the de-icing system may be obtained will now be provided with reference to FIG. 5.

To begin with, in method 200, a temperature difference across the condenser 16 is obtained in Step 205 based on a measurement of the inlet and outlet temperatures (i.e. the temperature difference between the incoming and outgoing coolant). Next, the mass flow rate through the condenser 16 needs to be determined in Step 210. This may be done directly using a flow rate sensor associated with the condenser 16 itself, or it may be done indirectly using a sensor or other measurement means to monitor the activity of the circulation pump 22.

The expected heat flow out of the condenser 16 can subsequently be determined in Step 215 by multiplying the obtained flow rate through the condenser 16 with the obtained temperature difference between the inlet and outlet of the condenser 16. Given the correlation between liquid water content and efficiency of the condenser 16, the liquid water content of the surrounding air can then be calculated in Step 220 for a given ambient temperature. A brief discussion of the theory underpinning this calculation, as well as a couple of different methods by which this calculation could be carried out, will now be provided.

In summary, computing or modelling the expected efficiency of the cooling system (given a set of known// measured environmental conditions), and comparing this expected efficiency to the measured efficiency, yields a residual value (i.e. a difference) which is assumed to result entirely from liquid water content in the surrounding air. Based on this assumption, an estimate of the liquid water content can therefore be computed.

A first method that may be used to estimate the expected efficiency of the system is referred to as a 'first principle approach' and is based on the basic engineering knowledge and principles of the cooling system 10. During the turbine design phase the efficiency of the condenser 16 (and hence of the cooling system 10 as a whole) has been calculated or tabularised using the engineering models made to scale the cooling system 10. It is therefore expected that a function expressing the expected heat flow $Q_{model}$ through the condenser 16, which is dependent on ambient temperature (T), fluid flow (F) and wind speed (V), would be available. Such a function would take the following form: $Q_{model}(F, T, V)$.

As previously mentioned, the actual or measured heat flow is calculated based on the difference between the inlet ($T_{in}$) and outlet ($T_{out}$) temperatures of the condenser 16, as well as the volume flow of coolant (F) through the condenser 16. A function expressing the measured heat flow $Q_{meas}$ through the condenser 16 could therefore be computed as follows: $Q_{meas}=(T_{in}-T_{out})FC$, where C is a constant that is dependent on the density and the heat capacity of the cooling fluid flowing through the cooling system 10.

By comparing the measured heat flow to the actual heat flow, a residual or difference can be computed: $Q_{res}=Q_{meas}-Q_{model}$. Assuming any discrepancy between the models is due to liquid water evaporation, it then follows that the liquid water being evaporated per second $M_{LW}$ (i.e. the rate of liquid water evaporation off the exposed surface of the condenser 16) can be calculated as $M_{LW}=Q_{res}/L_{water}$, where $L_{water}$ is the specific latent heat for water at a given ambient temperature.

Based on the dimensions and design of the condenser 16, it is then possible to relate the amount of water being evaporated from the surface of the condenser 16 with the liquid water content in the air. For example, this relation could be determined experimentally in a test stand. It is further noted that the latent heat of evaporating water (expressed in units of Joules per gram of water) can be approximated by a polynomial in temperature: $L(T)=a-bT+cT^2-dT^3$ J/g, where T is the ambient temperature. That means that the efficiency of the cooling will rise with L(T) J/s per gram of water evaporated per second.

An alternative method of modelling the expected efficiency of the cooling system 10, and hence the liquid water content in the air, is referred to as the 'data driven method'. This method assumes no prior knowledge of the physical relations between cooling efficiency and the liquid water content of the air. Instead, a model is created by e.g. a machine learning technique where the dedicated liquid water content measurement on the wind turbine 1 is used as a reference and the model is then fitted until it can accurately predict the directly measured liquid water content. An example of such techniques is 'Deep Learning', which makes use of neural networks to model the physics of heat flow.

Regardless of the method by which it is obtained, the calculated liquid water content value may be stored for subsequent use (for example in the data store 44), or it may be transmitted to another sub-system, either periodically or on demand, for use in decisioning processes that are carried out by that sub-system.

Subsequently, a risk assessment step 225 may be carried out to ascertain the risk of ice formation on the wind turbine blades 8 for the calculated liquid water content and at the given ambient temperature. For example, the percentage likelihood that substantial ice formation will occur can be ascertained. This could be carried out in a laboratory environment (for example, in a testbed under carefully controlled conditions), using simulations, or even simply by analysing existing data. Alternatively, state of the art ice detection systems, which comprise cameras or other image sensors that are coupled with dedicated liquid water content sensors, could be used to carry out such investigations on existing wind turbines, if these detections systems are already installed or are retrofit. These investigations would provide initial ice formation data which could form the basis for some initial thresholds to be defined. These initial thresholds would subsequently be adjusted based on learning algorithms after a sufficient number of wind turbines with this liquid water content detection apparatus have been investigated. A threshold percentage likelihood may therefore be determined in Step 230 that would necessitate activation of the de-icing system. This threshold percentage likelihood will correspond to a particular threshold outlet temperature value, below which the risk of ice formation is sufficiently high so as to warrant activation of the de-icing system.

A different threshold value may be calculated for each set of external and internal environmental conditions—for example, certain combinations of values (or ranges of values) of wind speed and ambient air temperature, as well as coolant flow rate, will correspond to particular threshold values. These values are stored by the control processor in the associated data store and are retrieved when the method of FIG. 4 is carried out.

Many modifications may be made to the above examples without departing from the scope of the present invention as defined in the accompanying claims.

For example, it should be noted that detecting icing risk for wind turbines, and thereby determining whether to activate a de-icing system of the wind turbine, is merely one specific application of the general concept which utilises the correlation between cooling system efficiency and the liquid water content of the surrounding air. As has been previously mentioned, it would also be possible to apply this general concept to drive other control or decision actions within a wind turbine system. For example, other functions of the wind turbine may be affected by the liquid water content of the surrounding air, and it may be desirable to also automate control of these functions based on the general concept described herein.

The invention claimed is:

1. An apparatus for monitoring an ambient environment of a wind turbine, the apparatus comprising:
a cooling system for the wind turbine comprising first and second heat exchangers, and a fluid circuit arranged to enable coolant to flow between the first and second heat exchangers; and
a processor configured to:
monitor a plurality of operational parameters of the cooling system;
determine a heat flow through the cooling system based on the monitored plurality of operational parameters;
determine a measured efficiency of the cooling system based on the heat flow;
determine a residual value of the cooling system based on the measured efficiency;
calculate a liquid water content of the ambient environment from a predefined relationship between the residual value of the cooling system and the liquid water content; and
activate a de-icing system for the wind turbine based on the calculated liquid water content and a threshold value.

2. The apparatus of claim 1, wherein the processor is further configured to:
determine an expected efficiency of the cooling system, wherein the residual value comprises a difference between the expected efficiency and the measured efficiency of the cooling system.

3. The apparatus of claim 1, wherein the processor is further configured to generate a control signal for output to a the de-icing system in dependence on the calculated liquid water content.

4. The apparatus claim 1, wherein the processor is further configured to transmit the calculated liquid water content to the de-icing system of the wind turbine.

5. The apparatus of claim 1, wherein the first heat exchanger is arranged to absorb thermal energy from an internal environment of the wind turbine.

6. The apparatus of claim 5, wherein the internal environment of the wind turbine corresponds to the internal environment of a nacelle of the wind turbine.

7. The apparatus of claim 1, wherein the second heat exchanger is arranged to transfer thermal energy to the ambient environment which is external to the wind turbine.

8. The apparatus of claim 7, wherein at least a portion of the second heat exchanger is located on a nacelle of the wind turbine.

9. The apparatus of claim 1, wherein the plurality of operational parameters to be monitored correspond to at least one of the following: an outlet temperature of the second heat exchanger, an inlet temperature of the second heat exchanger, and a volume of coolant flow through the second heat exchanger.

10. The apparatus of claim 1, wherein the processor is further configured to generate a control signal for output to the de-icing system if the calculated liquid water content of the ambient environment exceeds the threshold value.

11. A method for monitoring an ambient environment of a wind turbine, the method comprising:
monitoring a plurality of operational parameters of a cooling system of the wind turbine;
determining a heat flow through the cooling system based on the monitored plurality of operational parameters; and
determining a measured efficiency of the cooling system based on the heat flow;
determining a residual value of the cooling system based on the measured efficiency;
calculating a liquid water content of the ambient environment from a predefined relationship between the residual value of the cooling system and the liquid water content; and
activating a de-icing system of the wind turbine based on the calculated liquid water content and a threshold value.

12. The method of claim 11, further comprising:
determining an expected efficiency of the cooling system; and wherein the residual value comprises a difference between the expected efficiency and the measured efficiency, wherein the measured efficiency is based on one or more measured efficiencies of the cooling system.

13. The method of claim 11, further comprising:
generating a control signal for output to the de-icing system in dependence on the calculated liquid water content.

14. A wind turbine, comprising:
a tower;
a nacelle;
a generator disposed in the nacelle;
a rotor mechanically coupled to the generator at a first end;
a hub coupled to a second end of the rotor;
a plurality of blades coupled to the hub;
a de-icing system; and
an apparatus for monitoring an ambient environment of the wind turbine, the apparatus comprising:
a cooling system comprising first and second heat exchangers, and a fluid circuit arranged to enable coolant to flow between the first and second heat exchangers; and
a processor configured to:
monitor a plurality of operational parameters of the cooling system;
determine a heat flow through the cooling system based on the monitored plurality of operational parameters; and
determine a measured efficiency of the cooling system based on the heat flow;
determine a residual value of the cooling system based on the measured efficiency;

calculate a liquid water content of the ambient environment from a predefined relationship between the residual value of the cooling system and the liquid water content; and activate the de-icing system based on the calculated liquid water content and a threshold value.

15. The wind turbine of claim 14, wherein the processor is further configured to:

determine an expected efficiency of the cooling system; and wherein the residual value comprises a difference between the expected efficiency and the measured efficiency, wherein the measured efficiency is based on one or more measured efficiencies of the cooling system.

16. The wind turbine of claim 14, wherein the processor is further configured to generate a control signal for output to the de-icing system in dependence on the calculated liquid water content.

17. The wind turbine of claim 14, wherein the processor is further configured to transmit the calculated liquid water content to the de-icing system of the wind turbine.

18. The wind turbine of claim 14, wherein the first heat exchanger is arranged to absorb thermal energy from an internal environment of the wind turbine.

\* \* \* \* \*